UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

DIMETHYL-DIISOPROPYL-BENZIDIN AZO DYES AND PROCESS OF MAKING SAME.

1,314,926.

Specification of Letters Patent. Patented Sept. 2, 1919.

No Drawing. Application filed September 15, 1917. Serial No. 191,606.

*To all whom it may concern:*

Be it known that I, CHESTER E. ANDREWS, a citizen of the United States, residing at Pittsburgh, in the county of Allegheny and State of Pennsylvania, have invented Dimethyl-Diisopropyl-Benzidin Azo Dyes and Processes of Making Same, of which the following is a specification.

The present invention relates to dyes produced from dimethyl-diisopropyl-benzidin, by coupling with a suitable hydroxy aromatic body, or a derivative of such an aromatic body, and to the production of such dyes.

Dimethyl-diisopropyl-benzidin may conveniently be prepared by reducing mononitro-cymene in an alkaline solution, by means of powdered zinc to produce hydrazocymene, and then subjecting the latter to the benzidin reaction. Such a process and the product thereof are claimed in my co-pending application 191,605, filed September 15, 1917.

The process of the present invention is effected in a general way, by the following series of steps: Dimethyl-diisopropyl-benzidin is first tetrazotized and the product then coupled with the hydroxy body in an alkaline solution, while maintained at a temperature of 10° C. or below. This last mentioned reaction is likely to be rather slow, requiring in some instances one day and in some instances longer or shorter periods of time, depending upon the relative degree of activity of the hydroxy body employed, temperature, purity and other factors.

As a specific example of the process, the following is given: 29 parts of dimethyl-diisopropyl-benzidin are dissolved in about 300 parts of hot water containing 24 parts of hydrochloric acid (gravity 1.2) and the mixture is then cooled to about 10° C. While maintained at this temperature a further quantity of 36 parts of hydrochloric acid (gravity 1.2) is added, and about 14.4 parts of sodium nitrite, previously dissolved in a small amount of water is added. This produces the tetrazo derivative of dimethyl diisopropyl benzidin. The tetrazo derivative is added to about 32 parts of salicylic acid dissolved in 200 parts of water containing about 9.5 parts of caustic soda. The mixing is effected while stirring and while the mixture is kept at a temperature of 10° C. or below. The mixture is then stirred while at this temperature, until the reaction is completed, which in this particular example should be completed in about one day. During this time about 12 parts of caustic soda in solution are slowly added.

The stirring is then discontinued and the liquid, while still maintained at about 10° C. is allowed to settle, and the dye, in solid form separates out in the form of a yellowish brown powder, insoluble in water.

Instead of salicylic acid referred to in the above example, various other hydroxy bodies can be employed, such as alpha-naphthol, beta-naphthol, resorcinol, phenol, pyrogallol, or the derivatives of aromatic hydroxy bodies, particularly the sulfonic acid derivatives such as Schaeffer's acid (beta-naphthol mono sulfonic acid) gamma acid (2:8-amino-naphthol-6-sulfonic acid), R-acid (beta-naphthol-3:6-disulfonic acid), chromotropic acid (1:8-dioxy-naphthalene-3:6-disulfonic acid), H-acid (1-8-amino-naphthol-3:6-disulfonic acid), K-acid (1:8-amino-naphthol-4:6-disulfonic acid), RR-acid (2:8-amino-naphthol-3:6-disulfonic acid), Neville and Winther-acid (alpha naphthol sulfonic acid -1:4), Schoelkopf's acid alpha naphthol sulfonic acid-1:8), RG-acid (alpha naphthol-3:6-disulfonic acid), 1-naphthol-5-sulfonic acid.

With most of the simple hydroxy bodies, the sodium salt produced constituting the dye, is insoluble, whereas with the sulfonic acid compounds the sodium salt constituting the dye is in most cases soluble. Those dyes which are soluble, produced in accordance with this invention, can readily be separated from the solution by the customary method of "salting out."

In the present invention instead of using a single hydroxy aromatic body, a mixture of such bodies can be employed, or preferably one hydroxy body can be combined at one end of the dimethyl-diisopropyl-benzidin structure, and subsequently another hydroxy body (or under some circumstances other materials, such as amino aromatic bodies, in which case the amino group can be diazotized and coupled with any of the before-mentioned compounds) coupled at the other end of the structure.

The reactions taking place in the process of the present invention, employing salicylic acid as the specific example may be illustrated conveniently as follows:

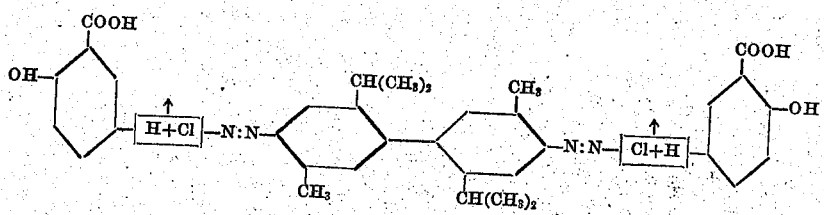

(two molecules of hydrochloric acid being formed by the union of hydrogen and chlorin.)

The following reaction is given as showing the reaction where an amino compound is coupled at one end, and a hydroxy body coupled thereto.

Example of tetrazotized dimethyl diisopropyl benzidin coupled at one end with salicylic acid and at the other with alpha naphthylamin which is diazotized and coupled with Neville and Winther's acid.

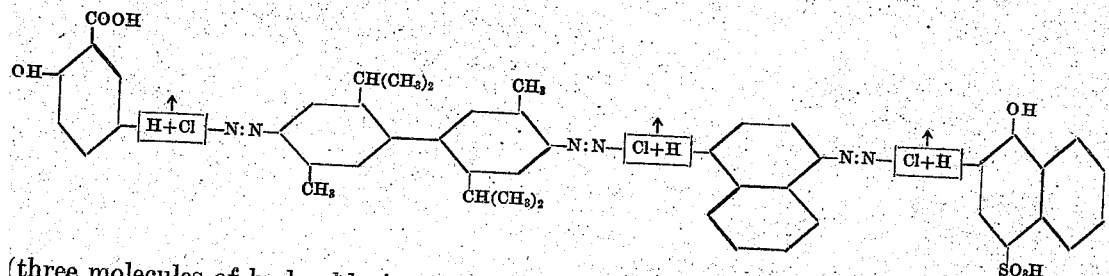

(three molecules of hydrochloric acid being formed)

What is claimed is:

1. The herein described new dyestuffs consisting of the tetrazo compound of dimethyl-iisopropyl-benzidin coupled with a hydroxy romatic compound, said dyes being capable f dyeing fabric in an acid bath.

2. The herein described new dyestuffs consisting of tetrazo dimethyl-diisopropyl-benzidin coupled with two hydroxy aromatic bodies, at least one of which contains the naphthalene nucleus.

In testimony whereof I affix my signature.

CHESTER E. ANDREWS.